United States Patent
Dumans

(10) Patent No.: US 9,973,452 B2
(45) Date of Patent: May 15, 2018

(54) METHOD AND SYSTEM FOR EXCHANGING EMAILS

(71) Applicant: TIMYO HOLDINGS, INC., Beverly Hills, CA (US)

(72) Inventor: Fabrice Dumans, Paris (FR)

(*) Notice: Subject to any disclaimer, the term of this patent is extended or adjusted under 35 U.S.C. 154(b) by 499 days.

(21) Appl. No.: 14/797,665

(22) Filed: Jul. 13, 2015

(65) Prior Publication Data
US 2015/0319123 A1 Nov. 5, 2015

Related U.S. Application Data

(63) Continuation of application No. 13/927,906, filed on Jun. 26, 2013, now Pat. No. 9,191,345.

(51) Int. Cl.
| | |
|---|---|
| G06F 3/0481 | (2013.01) |
| H04L 12/58 | (2006.01) |
| G06F 3/0482 | (2013.01) |
| G06F 3/0484 | (2013.01) |
| G06F 3/0488 | (2013.01) |

(52) U.S. Cl.
CPC ............ H04L 51/04 (2013.01); G06F 3/0482 (2013.01); G06F 3/0484 (2013.01); G06F 3/0488 (2013.01); G06F 3/04817 (2013.01); H04L 51/18 (2013.01); H04L 51/22 (2013.01)

(58) Field of Classification Search
CPC .................................................. G06F 3/04817
USPC ......................................................... 715/752
See application file for complete search history.

(56) References Cited

U.S. PATENT DOCUMENTS

| | | | | |
|---|---|---|---|---|
| 7,136,897 | B1* | 11/2006 | Raghunandan | G06Q 10/00 709/206 |
| 7,721,224 | B2* | 5/2010 | Sellen | G06Q 10/109 715/764 |
| 8,271,590 | B2* | 9/2012 | Dreyfus | H04L 51/00 709/205 |
| 8,805,942 | B2* | 8/2014 | Santos | H04L 51/00 709/200 |
| 8,972,495 | B1* | 3/2015 | Borna | H04L 51/08 709/204 |
| 2002/0026490 | A1 | 2/2002 | Okamura | |

(Continued)

FOREIGN PATENT DOCUMENTS

WO    WO99/64972    12/1999

*Primary Examiner* — Reza Nabi
(74) *Attorney, Agent, or Firm* — Welsh Flaxman & Gitler LLC

(57) ABSTRACT

A communication system and method for organization, preparation and viewing of emails, including a graphical user interface operating on a display of a computing device. The graphical user interface includes: a writing interface with writing functions; a reading interface with a plurality of reading functions; and an organizing interface with a plurality of organizing functions. The writing functions including a recipient action identifier indicating what is expected of the recipient with regard to the sent email, what folder the writer has designated the email is to be stored in on the recipient computing device, a read date identifying a date on which the writer wishes the recipient to read the email, and a writing block for text associated with a message being sent in accordance with the email. The recipient action identifier and the read date are appended to the email and by a computer system of a recipient upon receipt of the email by the recipient.

2 Claims, 21 Drawing Sheets

(56) References Cited

U.S. PATENT DOCUMENTS

| | | | |
|---|---|---|---|
| 2002/0116641 A1* | 8/2002 | Mastrianni | G06Q 10/107 726/11 |
| 2002/0147778 A1* | 10/2002 | Dutta | H04L 51/22 709/206 |
| 2004/0177120 A1* | 9/2004 | Kirsch | H04L 29/06 709/206 |
| 2005/0015451 A1* | 1/2005 | Sheldon | H04L 51/12 709/206 |
| 2005/0188030 A1* | 8/2005 | Hudecek | G06Q 10/107 709/206 |
| 2006/0010213 A1* | 1/2006 | Mehta | G06Q 10/107 709/206 |
| 2006/0085238 A1* | 4/2006 | Oden | G06Q 10/06311 705/7.15 |
| 2006/0168039 A1* | 7/2006 | Worthington | H04L 63/0442 709/206 |
| 2006/0282503 A1* | 12/2006 | Gwozdz | G06Q 10/107 709/206 |
| 2007/0112916 A1* | 5/2007 | Singh | G06Q 10/107 709/206 |
| 2007/0250377 A1* | 10/2007 | Hill, Jr. | G06Q 10/00 705/7.13 |
| 2008/0147818 A1* | 6/2008 | Sabo | G06Q 10/00 709/206 |
| 2008/0270557 A1* | 10/2008 | Bhamidipaty | G06Q 10/107 709/206 |
| 2009/0106370 A1* | 4/2009 | Dreyfus | H04L 12/58 709/206 |
| 2009/0228560 A1* | 9/2009 | Sholtis | G06Q 10/107 709/206 |
| 2010/0088379 A1 | 4/2010 | Borenstein et al. | |
| 2010/0191818 A1* | 7/2010 | Satterfield | G06Q 10/107 709/206 |
| 2010/0235449 A1* | 9/2010 | Eggers, Jr. | G06Q 10/107 709/206 |
| 2012/0173643 A1* | 7/2012 | Singh | G06Q 10/107 709/206 |
| 2012/0215866 A1* | 8/2012 | Satterfield | G06Q 10/107 709/206 |
| 2013/0219003 A1* | 8/2013 | Singh | G06Q 10/107 709/206 |
| 2014/0067702 A1* | 3/2014 | Rathod | G06Q 10/10 705/319 |

* cited by examiner

METHOD AND SYSTEM FOR EXCHANGING EMAILS

CROSS REFERENCE TO RELATED APPLICATIONS

This application is a continuation of U.S. patent application Ser. No. 13/927,906, entitled "Method and System for Exchanging Emails", filed Jun. 26, 2013, which is currently pending.

BACKGROUND OF THE INVENTION

1. Field of the Invention

The present invention relates to a method and a system of exchanging emails. The invention can be used with any device that allows sending emails through a web browser, which includes personal computers, tablets or mobile phones. It can also be used through any email software that runs on any such device. The invention modifies the way a user writes and sends emails in a way that it is easier for the sender and the receiver of such emails to organize, sort and treat their emails.

2. Description of the Related Art

The volume of emails sent and received has many people feeling as though they are drowning under a flood of email. Endless messages come in waves faster than you can ever hope to deal with them-discussion threads in their $n^{th}$ lap, file attachments that need your edits or comments (again), tasks your boss asked you to finish, favors your colleagues have asked of you, meetings you're supposed to be a part of, newsletters you signed up for, never-ending personal messages, semi solicited sales messages, or spam that crept in in-spite of all those spam filters. With all of this many of us feel like we are spending more time playing catch up with emails, rather than actually getting quality work done, and are forever hounded by the nagging feeling that we have missed something.

Common acceptance argues that we've got the problem all wrong. If email deluge is a problem, we are part of the problem. We are not using email for what it was meant for or for what it was designed for. It is from this the problem of email, chaos stems, as does the problem of constant distraction and productivity sapping due to email interruptions. Email is actually working against us.

Daily e-mail volume is now at 247 billion a day worldwide and increasing, as projected by The Radicati Group, a market research firm. To top that, there will be around 40 trillion spam e-mail messages delivered in 2009. A late 2007 Basex Research study estimated that businesses lose $650 billion annually in productivity due to unnecessary e-mail interruptions. Additionally, the average number of corporate emails sent and received per person per day is expected to reach over 228 by the year 2015.

Until the development of the present email exchange system, all solutions to the problem of email overload have assumed that the torrent on incoming mail is an uncontrollable variable. Most approaches revolve around "management" of email influx, and the approaches are helpless about actually controlling the torrent of emails. For example, the following strategies have been contemplated:

Accommodate it All: With latest storage technologies allowing the storage of greater and greater amounts of data more easily, one approach is to simply expand storage space. The attitude simply is-bring on the email deluge, we can take it.

Better Search: Another variant of the above approach is to improve search capabilities of the email system. The vast sea of emails remains, but we find better ways to dive in and retrieve the email we want.

Better Spam Filters: Another approach is to develop more intelligent spam filters, which ensure that only legitimate emails end up in your inbox. The question to be asked here is, how much of the problem is actually caused by spam?

The "Getting Things Done" Approach: Another approach is that of "managing your inbox better". You can find endless articles online, each written by people who have devised individual strategies around better managing email deluge and maximizing productivity.

Better managing your email time: Many email battered experts suggest the time you spend checking and responding to emails should be strictly managed. Turn notifications off and curb the obsessive compulsive urge to go check mail every ten minutes expecting a critical mail in your inbox.

Effectively Organizing your Email: The second strategy revolves around better categorizing and filing the emails you receive. Emails could be filed in "go through", or "urgent", or "doesn't need attention right now" folders, which can be checked according to priority.

Subject Lines: Another solution is to modify and optimize the subject lines of emails so that you can easily search and retrieve them when the need arises.

Exemplary of such systems is US Patent Application Publication No. 2009/0106370 which describes a computer-implemented method of sorting electronic messages, the system sorts the email by identifying at least one recipient of an electronic message and retrieving a classification scheme of the recipient. An identifier can be included within the electronic message. The identifier can specify a tag selected from the classification scheme of the recipient. The electronic message, including the identifier specifying the selected tag, can be sent.

The common thread in all the above approaches is that they're fatalistic. There is no attempt to define the problem, or an attempt to seek out "how did we get here in the first place". The problem has been accepted as a given—that we can't get away from a sea of emails.

As it is well appreciated the objective of technology, including email, is to enhance employee productivity and information management, the present system and methodology attempts to overcome the problems associated with the overburdened email systems by helping users reduce the email deluge, streamline information management and increase overall productivity.

SUMMARY OF THE INVENTION

It is, therefore, an object of the present invention to provide a communication system and method for organization, preparation and viewing of emails, including a graphical user interface operating on a display of a computing device. The graphical user interface includes: a writing interface with a plurality of writing functions; a reading interface with a plurality of reading functions; and an organizing interface with a plurality of organizing functions. The plurality of writing functions include a recipient action identifier indicating what is expected of the recipient with regard to the sent email, what folder the writer has designated the email is to be stored in on the recipient computing device, a read date identifying a date on which the writer wishes the recipient to read the email, and a writing block for text associated with a message being sent in accordance with the email. The recipient action identifier and the read date are appended to the email and used by a computer system of a recipient upon receipt of the email by the recipient.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to the various figures, a communication method and system 10 for the organization, preparation and viewing of emails is disclosed. The communication system 10 operates on any available computer system 16 and is employed through a graphical user interface 20 displayed upon a display 18 of the available computer system 16. It is appreciated the computer system 16 may take the form of a desktop computer, laptop computer, tablet computer, smartphone, or other available computer system. Similarly, it is appreciated the display 18 may take various forms including a conventional monitor with a keyboard/mouse interface, a touchscreen allowing for direct physical interface with the display as is commonly employed with tablet computers and smartphones, or other interface formats known to those skilled in the art.

Figure 2:
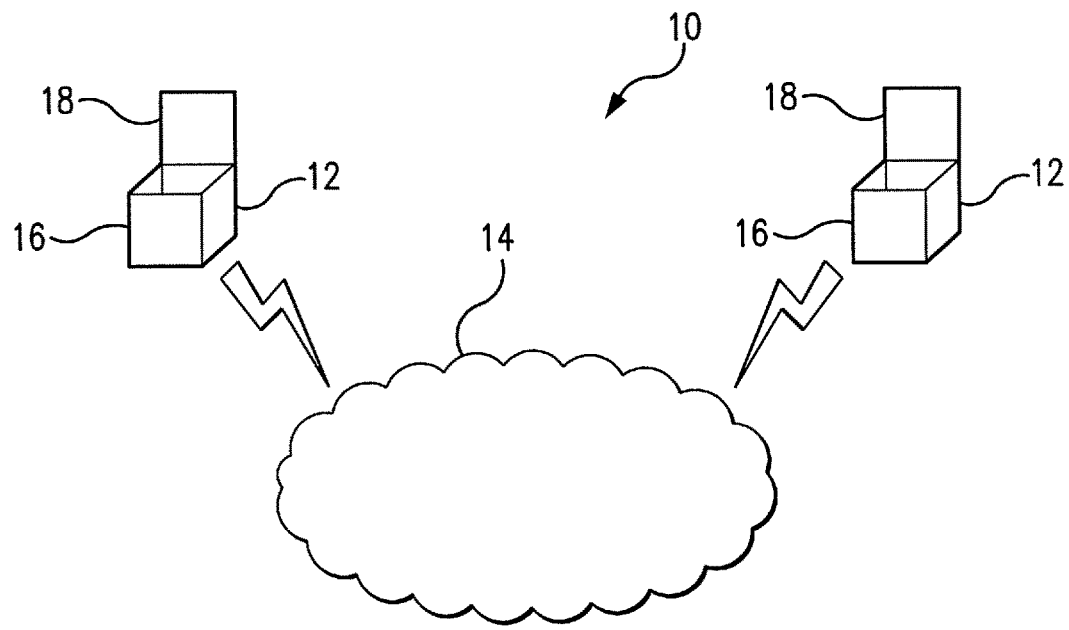
FIG. 2 is a schematic overview of the present system.

In practice, and with reference to FIG. 2, the present communication method and system 10 allow for communication between and amongst various individuals 12 connected over a global communication network 14, for example, via the Internet. The present disclosure refers to various participants of the communication method and system 10 as writers and recipients. However, it is appreciated writers of such emails will most certainly also be recipients of such emails and recipients of such emails most certainly will be writers of such emails. Ultimately, both writers and recipients are simply users of the present system taking advantage of the efficiencies offered thereby.

The present communication method and system 10 is especially suited for enterprise level deployment and, as such, it is appreciated various features and functionalities may be modified, locked or initiated by an administrator of the present enterprise level system. The communication method and system 10 provides for the organization, preparation and viewing of emails based upon instructions provided by the writer of the email. As such, a recipient may rely upon such instructions so that the writer will be confident that such emails will be properly considered. The communication method and system 10 also enhances the efficiency of the recipient who may rely upon the instructions of the writer without necessitating any complicated actions on the part of the recipient to ensure the email is timely considered and acted upon.

The communication method and system 10 relies upon a graphical user interface 20 operating on a display 18 of the computing device 16. The graphical user interface 20 includes a writing interface 22 with a plurality of writing functions, a reading interface 24 with a plurality of reading functions; and an organizing interface 26 with a plurality of organizing functions. As will be appreciated based upon the following disclosure, the functions are accessed in a convenient and intuitive manner using icons allowing for ready access to the plurality of writing functions, the plurality of reading functions and the plurality of organizing functions. The use, function and positioning of these functions will become apparent with the following disclosure.

Referring to FIGS. 3-10, 13 and 14, the plurality of writing functions include a recipient action identifier 44 indicating what is expected of the recipient with regard to the sent email. The plurality of writing functions also include a read date 46 identifying a date on which the writer wishes the recipient to read the email and a due date 49 identifying a date by which the writer wishes the recipient to complete a requested task. Further, and as is commonly employed with traditional email systems, the plurality of writing functions includes a writing block 49 for text associated with a message being sent in accordance with the email. The recipient action identifier 44, the read date 46 and the due date 49 are appended to the email and deployed by a computing device 16 of a recipient upon receipt of the email by the recipient. As will be appreciated based upon the following disclosure, this information is used by software in the computing device 16 of the recipient in determining the folder in which the writer has designated the email should be stored.

For example, an email prepared at the writer's computing device is appended with an action identifier 44, a read date 46 and/or a due date 49. When it is received at the recipient's computing device 16, it is placed in the appropriate folder(s) in accordance with the mechanism implemented in accordance with the present invention.

Figure 1:
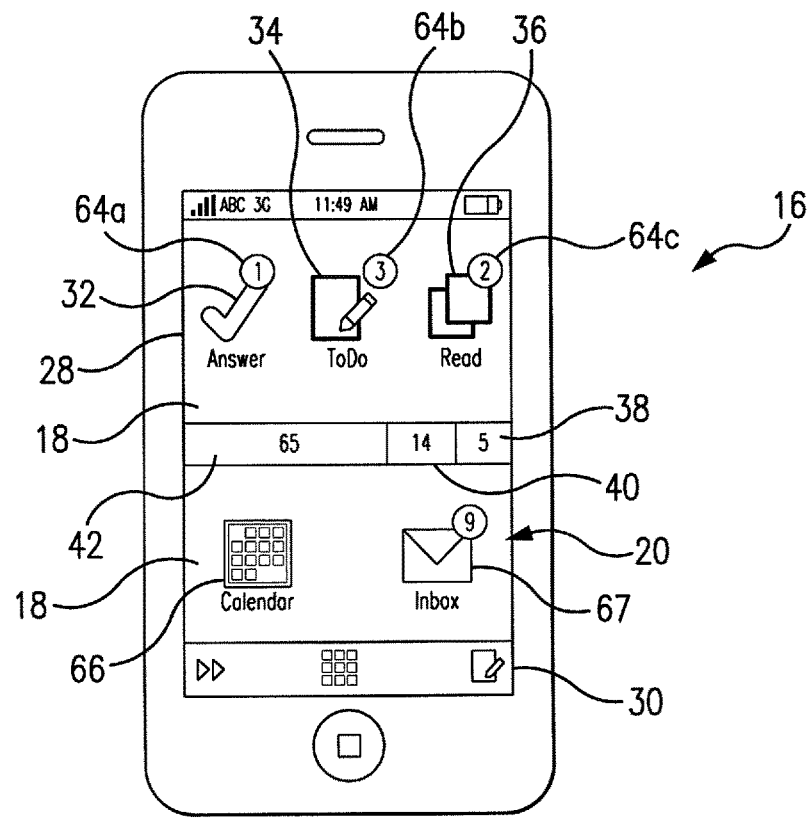
FIG. 1 is a front view of a computing device showing the home screen of the present system.

Briefly, and with reference to FIG. 1, the home screen 28 of the graphical user interface 20 provides a plurality of distinct icons allowing for instant access to various functions associated with the writing interface 22, reading interface 24 and the organizing interface 26 as well as indicators providing the user with instant knowledge regarding the status of various functionalities associated with the present system 10. For example, the user, i.e. the writer, may immediately begin writing an email by simply clicking upon the write icon 30. Similarly, the user, i.e. the recipient, may immediately begin reading emails requiring an answer by simply clicking upon the read/answer icon 32; begin reading emails requiring an associated action by simply clicking upon the read/ToDo icon 34; or begin reading emails simply requiring that the emails be read by clicking upon the read/read icon 36. The number of emails in each category is specified by a designator, i.e. red (or another distinctly visible color) numbers 64*a-c* associated with the specific icon. Where organization is required, the recipient may click upon emails required to be read on a specific date by clicking on a late read icon 38, a timely read icon 40 or an early read icon 42. The recipient might also wish to access emails via the calendar icon 66 or simply check an inbox 67.

As mentioned above, and with particular reference to FIGS. 3-10, 13 and 14, the present system 10 offers a variety of writing functions associated with the writing interface 22. These writing functions include a recipient action identifier 44 indicating what is expected of the recipient with regard to the sent email, a read date 46 identifying a date on which the sender wishes the recipient to read the email, and a writing block 48 for text associated with the message being sent in accordance with the email. The writing functions also include a due date 49 identifying a date by which the writer wishes the recipient to either respond to the email or take an action specified in the email, and other functionalities discussed below in greater detail. As will be fully appreciated based upon the following disclosure, these functionalities, once activated and identified by the writer, are appended to the email and applied by the computing device 16 of the recipient upon receipt of the email by the recipient.

With this in mind, and when a writer desires to send an email, an intuitive writing interface 22 provides a mechanism for preparing and sending emails in an efficient and effective manner. The intuitive writing interface 22 helps the writer to write emails such that with a few simple clicks, vital information, which assists both the writer and recipient, is provided to the recipient. The implementation of these functionalities enhances user experience in reading emails.

Figure 3:
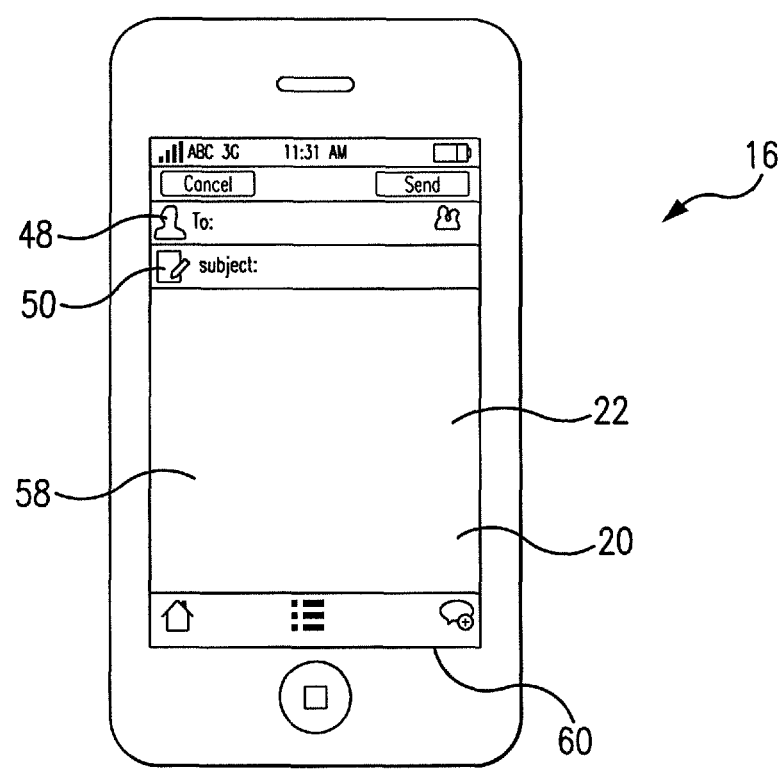
FIGS. 3-10 disclose functionalities associated with the writing interface of the present system.
Figure 4:
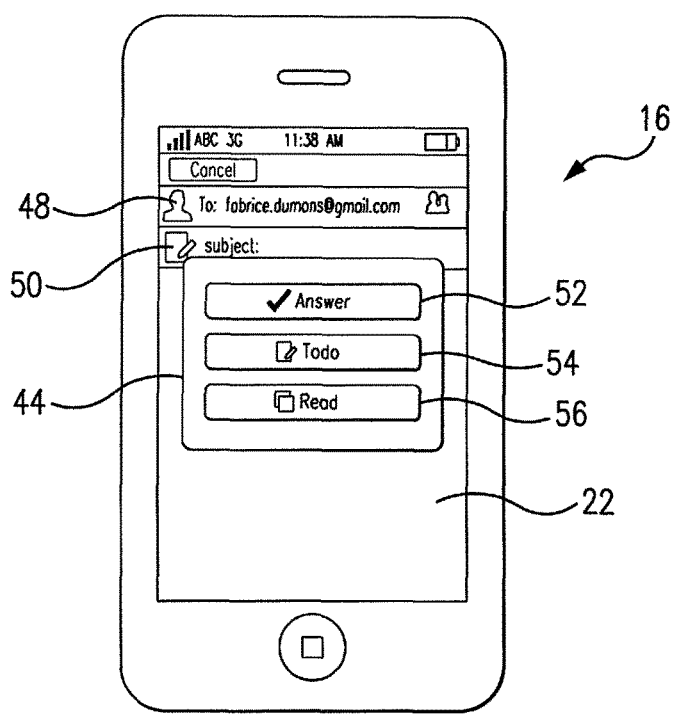
Figure 5:
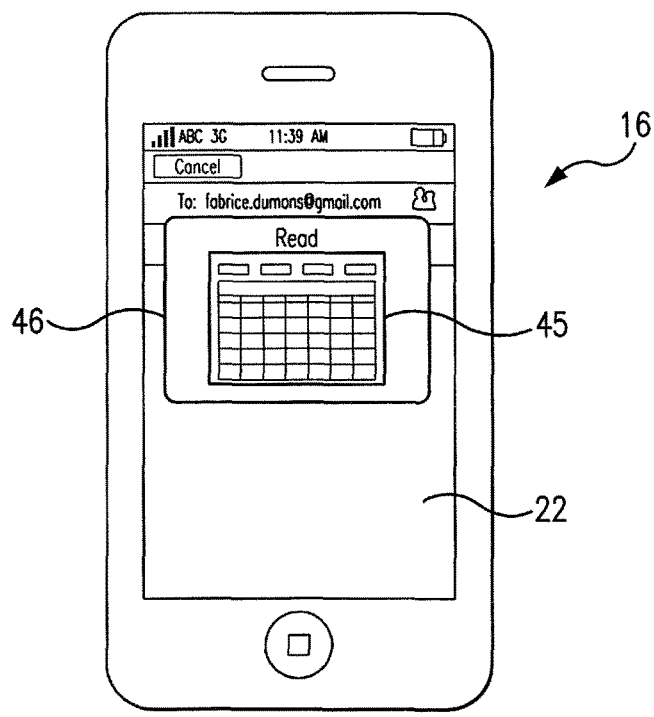
Figure 6:
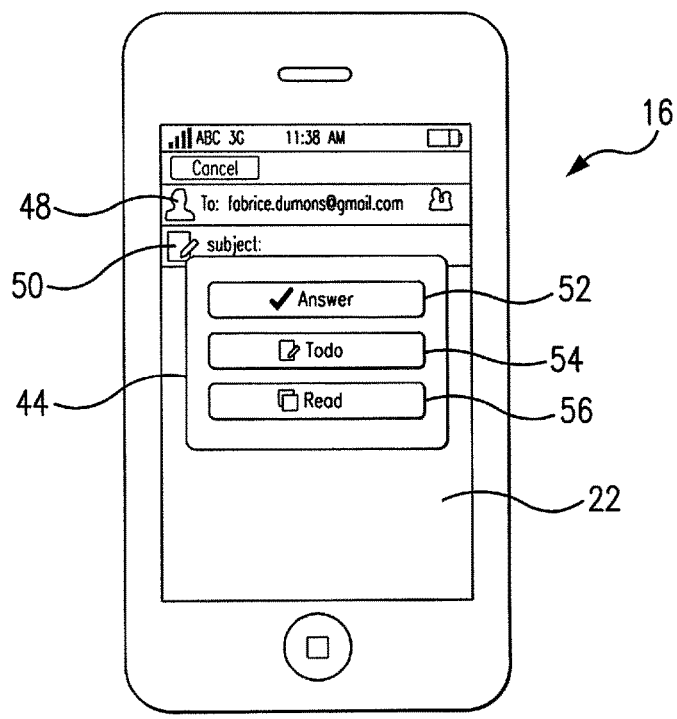
Figure 7:
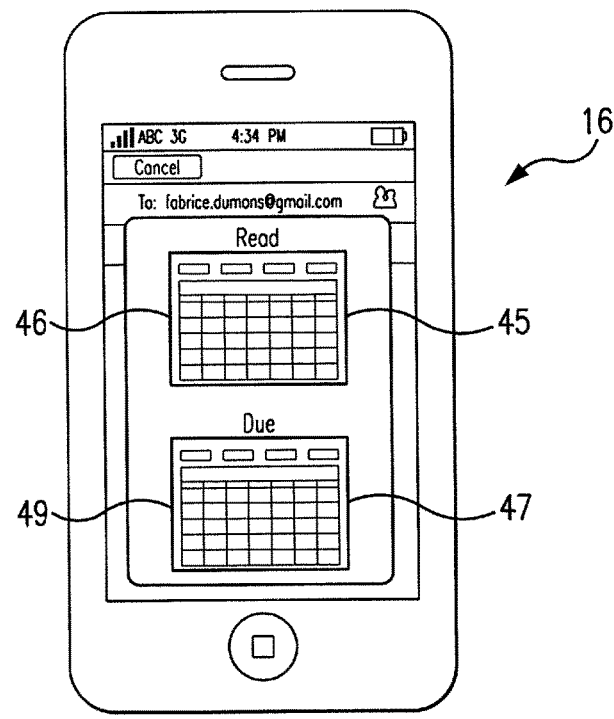
Figure 8:
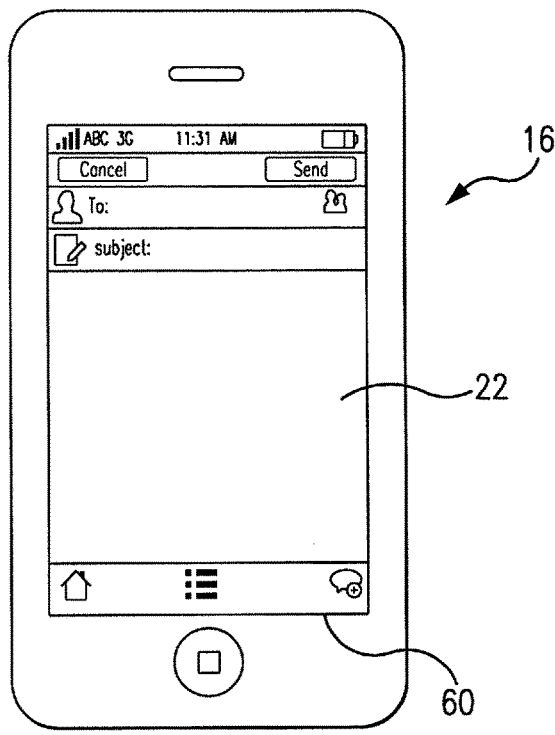
Figure 9:
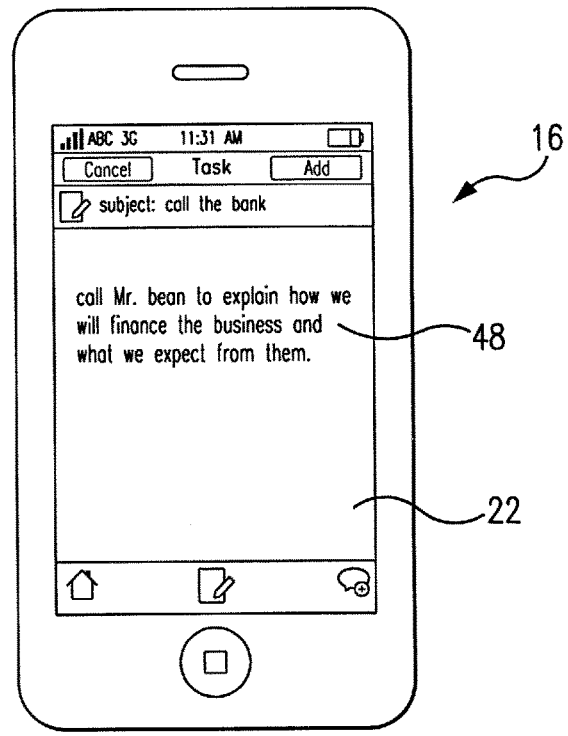
Figure 10:
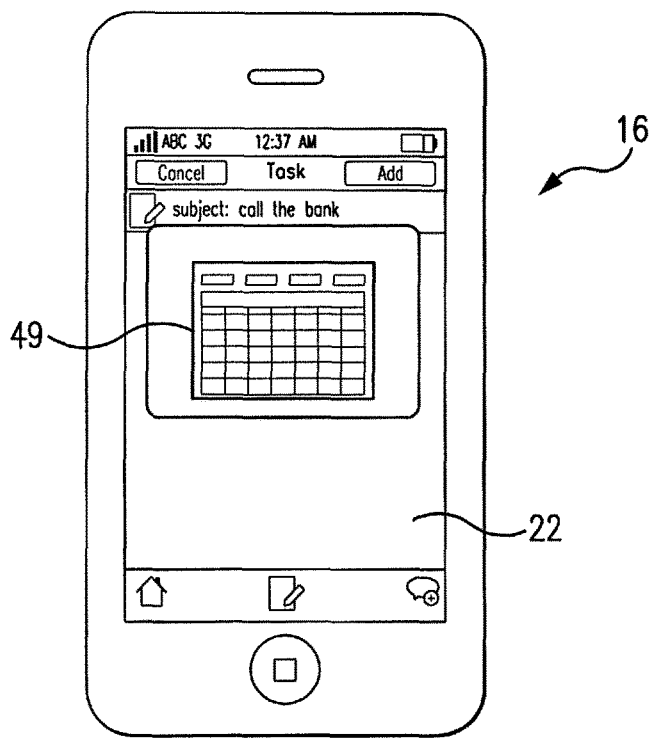
Figure 11:
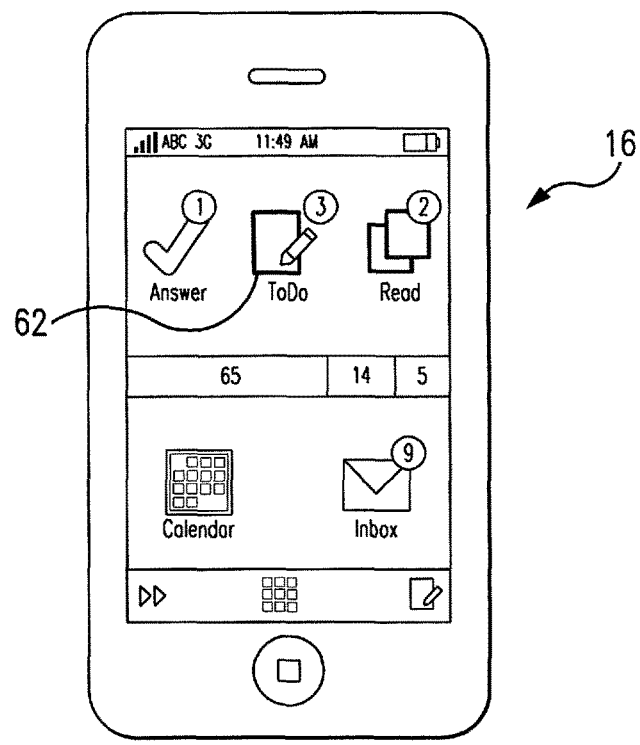
FIG. 11 is a view of the home screen showing the ToDo icon after the creation of a task with the number of tasks noted adjacent thereto.

Referring to FIGS. 1, 3, 4, 5, 6 and 7, with the writer on the system home screen 28, he or she simply clicks upon the write icon (that is, the new email icon) 30 and a writing interface 22 for the preparation of a new email is presented (see FIG. 3). The writing interface 22 includes a tradition "To: . . . " line 48 and a traditional "Subject: . . . " line 50. However, and in contrast to traditional email preparation interfaces, the present writing interface 22, upon the initiating of the preparation of an email, the system 10 prompts the writer with a series of screens allowing the writer to append specific instructions to the email for processing by the computing device 16 of the recipient; that is, the writing interface 22 allows the writer the option of appending various instructions indicating that which is expected of the recipient with regard to the sent email. For example, once a writer indicates a desire to prepare and send an email, the recipient action identifiers 44 are displayed and the writer is prompted to check the appropriate recipient action identifier 44 (see FIG. 4). The recipient action identifier 44 includes labels identifying the email as requiring the receiver to answer the email 52, to perform an action in accordance with the email 54, or to read the content of the email 56. Once the writer has selected a recipient action identifier 44, the selected recipient action identifier 44 is appended to the email at the time it is sent to the recipient for processing by the system 10 in a manner fully appreciated based upon the following disclosure.

Where the recipient is required to simply read the email 56, the writer is prompted with a calendar 45 in which the writer may specify a read date 46 (see FIG. 5). In contrast, where the recipient is required to perform an action in response to the email 54 or to answer the email in response to the email 52, the writer is prompted with both a calendar 45 in which he or she may indicate a read date 46 and a calendar 47 in which he or she may indicate a due date 49 (see FIG. 7).

As mentioned above, the writing interface 22 further provides the writer with the option of appending a read date 46 identifying a date on which the writer wishes the recipient to read the email. The option for the writer to enter a read date 46 and/or a due date 49 is automatically provided during the process and sequence of screens leading to the preparation and sending of an email. As such, and after the writer indicates the recipient action identifier 44, the writer is prompted with a screen offering the option of entering a read date 46 and a due date 49 (for example, in the situation where an action by the recipient is required). The read date 46 includes a date specific label identifying when the writer wishes the recipient to read the email. The due date 49 includes another date specific label identifying when the writer wishes the recipient to either answer the email 52 or to perform the action requested in the email 54. Once the writer has selected a read date 46, the selected read date 46 is appended to the email at the time the email is sent to the recipient for processing by the communication method and system 10 in a manner fully appreciated based upon the following disclosure.

As for the actual writing of the email, the writing interface 22 provides the writer with a traditional text box 58 in which he or she can write a desired message.

Figure 12:
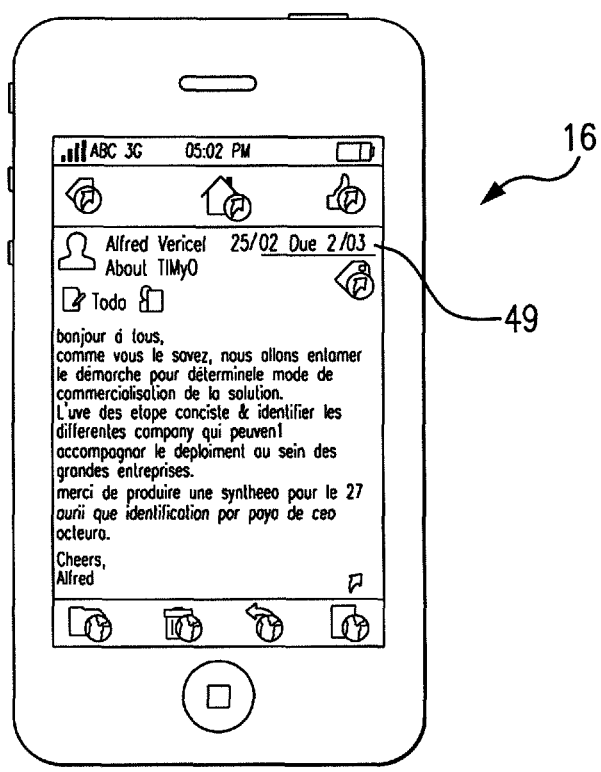
FIG. 12 is a view of an email showing a due date created after the establishment of a task.
Figure 13:
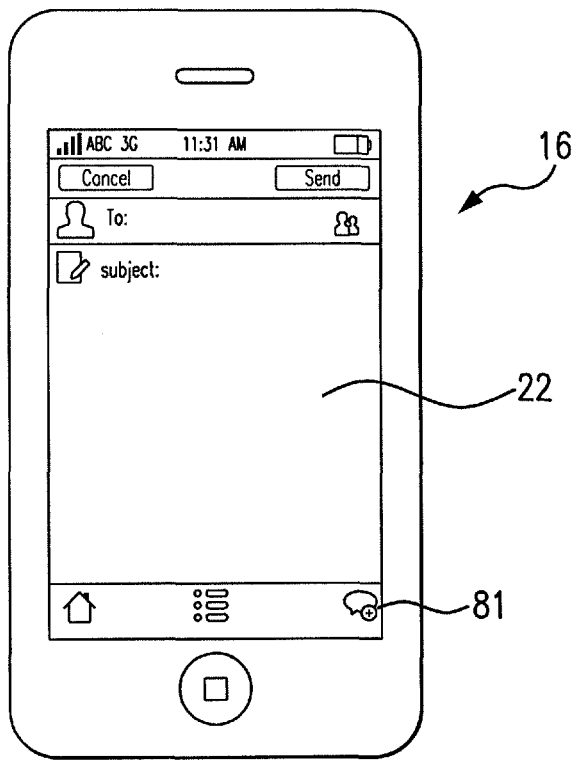
FIGS. 13 and 14 show the conversation functionality associated with the writing interface.

Referring now to FIGS. 8, 9, 10 and 11, it is further appreciated the writing interface 22 may be used in creating an action to be accomplished. The writer creates an action to remind themselves that they are required to take a specific action by a specific date. In particular, the writer clicks upon the ToDo icon 60 of the writing interface 22 and then proceeds to create an "email" (that is, a notice for some action the writer, themself, must undertake) identifying that the writer is required to perform a specific action (as noted in the writing block 48) in accordance with the email. Once the specific action is identified in the writing block 48, the writer is prompted to specify a due date 49. Such an email, when addressed to the writer will go into the Todo folder 94 of the writer providing him or her an indication that some action must be undertaken by the noted due date 49. When the writer desires to view the created action, it is displayed as a received ToDo message with a due date 49, as shown in FIG. 12. The act folder 62 is used to store all kinds of acknowledgements, from the simple click on the acknowledgement icon 72 to any short message such as a thank you note, an agreement or disagreement note, or a specific action, such as, I'm talking care of it soon.

Figure 14:
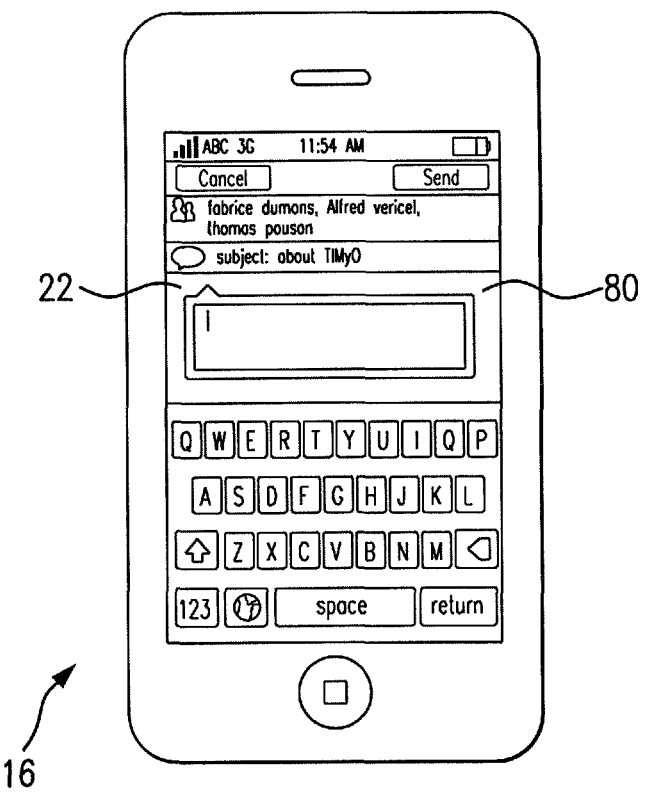

The writing interface 22 is further provided with a communication format function 80. For example, the communication format function allows the writer to switch from communicating in an email (long) form (see FIG. 13) to communicating in a short format protocol (see FIG. 14) by simply checking the conversation mode icon 81 which provides the writer with the writing interface. For example, the writer might wish to employ Short Message Service (SMS). It is appreciated that SMS is a text messaging service component of phone, web, or mobile communication systems, using standardized communications protocols that allow the exchange of short text messages between fixed line or mobile phone devices. The term "SMS" as used herein, and as understood by those skilled in the art is used as an acronym for all types of short text messaging and the user activity itself in many parts of the world.

Where the writer wishes to communicate in a short format protocol, he or she simply clicks upon the conversation mode icon 81 and the graphical user interface switches to an interface format suitable for short format protocol communication as shown in FIG. 14. As is appreciated, the recipient computer system will open the interface format suitable for short format protocol communications and thereby will open the connection between the two individuals.

Figure 15:
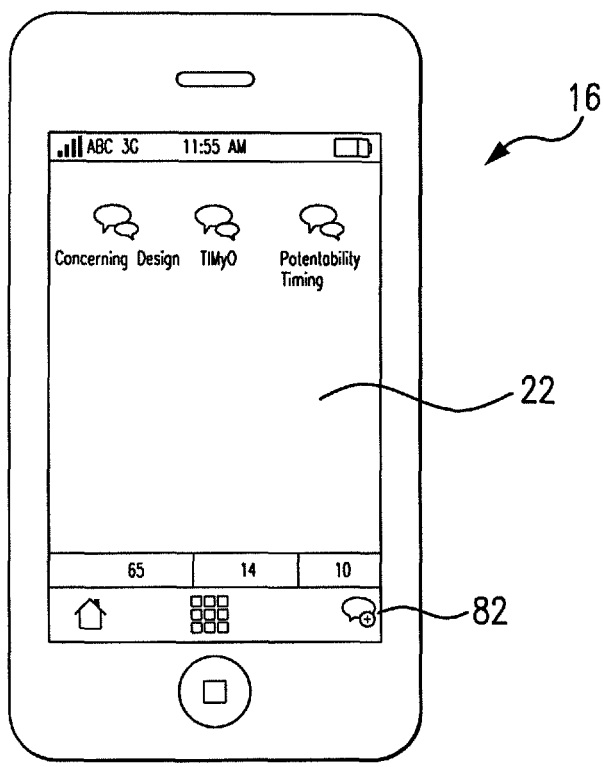
FIGS. 15 and 16 show the conversation functionality associated with the reading interface.
Figure 16:
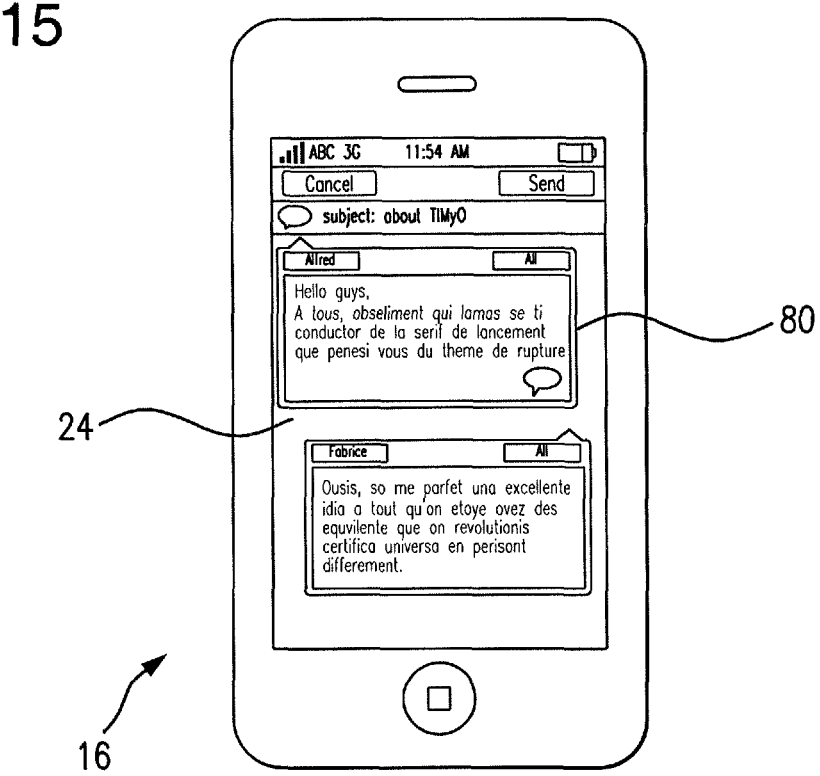

Similarly, and as will be appreciated based upon the following disclosure, the reading interface 24 is provided with a conversation mode icon 82 allowing for immediate communication via short format protocol with the writer of a short format protocol communication received by the recipient (see FIGS. 15 and 16). As such, it is appreciated that the communication format function 80 provided in conjunction with the reading interface 24 employs features of the writing interface 22, and an overlap of functionalities does exist. As such, the conversation format 80 can be chosen while writing the message or while reading the message.

Figure 17:
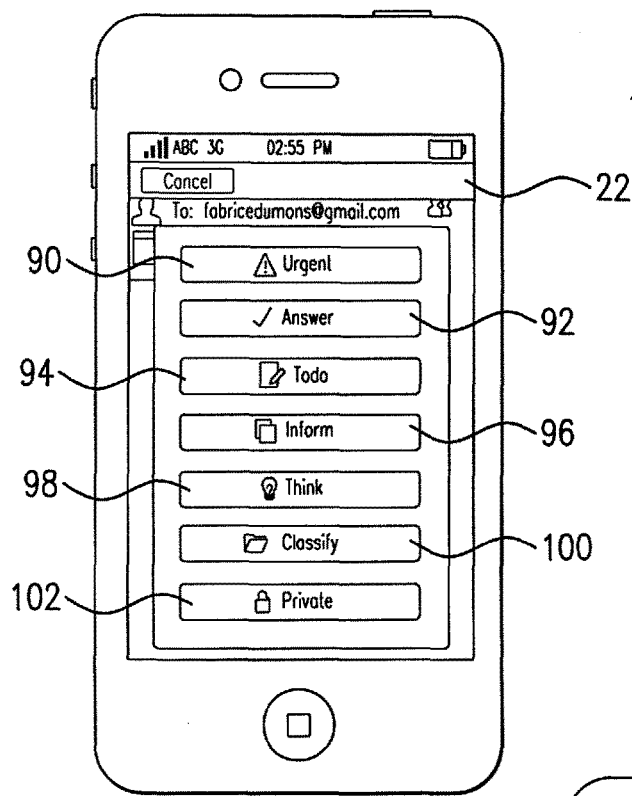
FIGS. 17, 18 and 19 show the ability of a writer to designate emails for classification in various folders.
Figure 18:
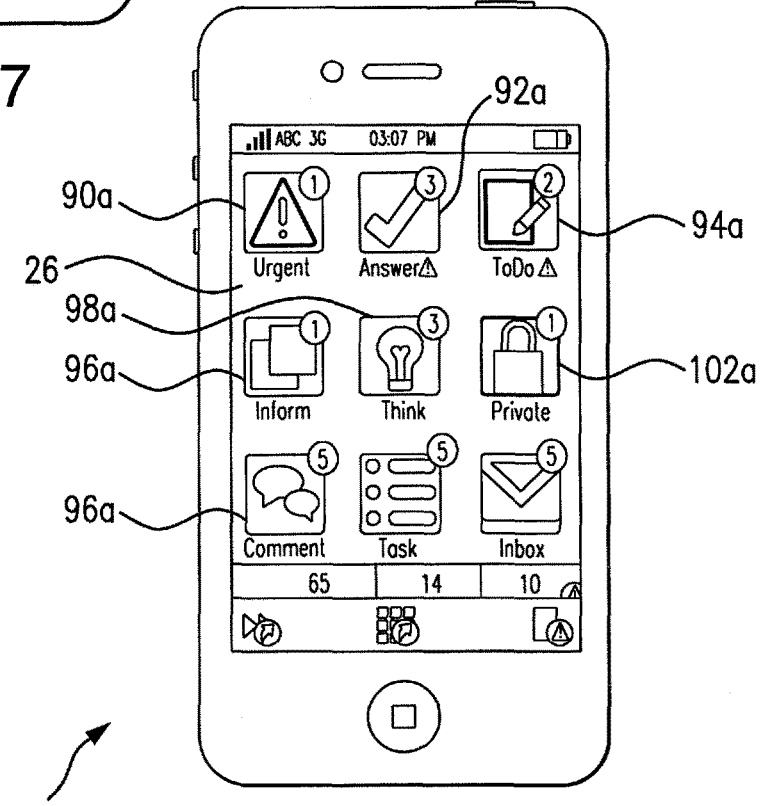
Figure 19:
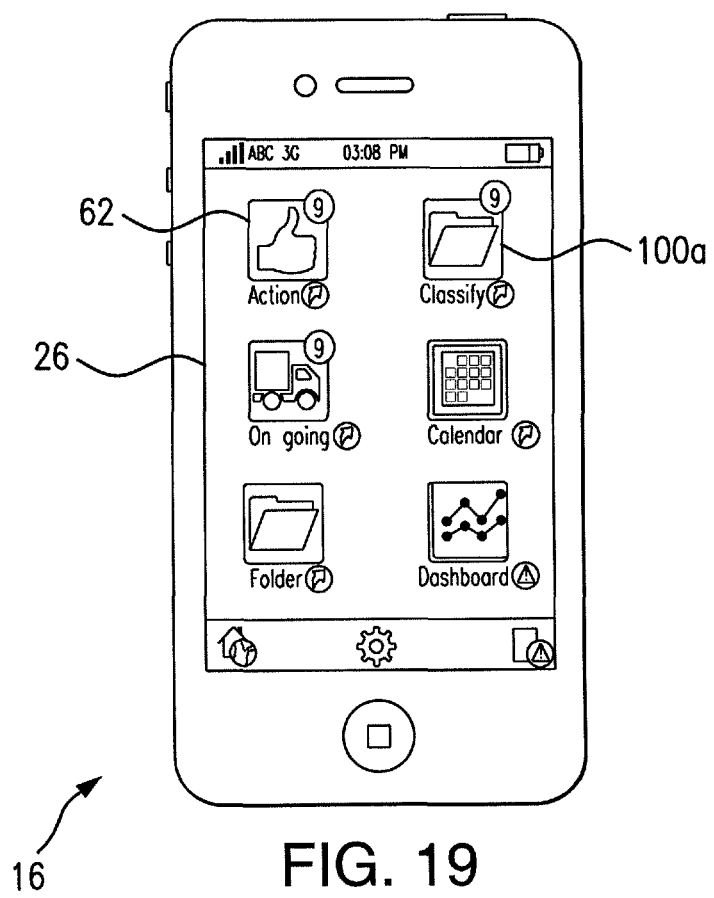

The writing interface 22, in conjunction with the organizing interface 26, allows the writer to designate the emails or short format protocol communications for classification in various folders, 90a, 92a, 94a, 96a, 98a, 100a, 102a as shown in FIGS. 17 and 18. Accordingly, the writer may specify folders into which the email should go when received by the recipient; for example "Urgent" 90, "Answer" 92, "ToDo" 94, "Inform" 96, "Think" 98, "Classify" 100 and "Private" 102 (see FIG. 17). It is appreciated the present system has been developed for enterprise level usage and such the designators may be adapted and adjusted to suit the needs of the specific companies.

As such, an email prepared at the writer's computing device 16 is appended with a folder identifier, for example, "Urgent" 90. When it is received at the recipient's computing device 16, it is placed in the appropriate folder(s) 90a (recipient's Urgent folder) in accordance with the mechanism implemented in accordance with the present invention. It is appreciated that such an email may also have an action identifier 44, a read date 46, or a due date 49 or other identifiers discussed herein.

Referring now to FIGS. 20 to 26 when the recipient receives emails, they are processed and available for review via the reading interface 24. Using the reading interface 24, the present communication method and system 10 offers a variety of reading functions. These reading functions include icons 32, 34, 36 identifying emails based upon a recipient action identifier 44 applied by the writer of the mail, and a read calendar 66 indicating dates on which received emails are intended to be read and/or due to be read.

With this in mind, and when a recipient desires to read an email, he or she may select amongst various ways in which the recipient accesses the received emails. For example, and with reference to FIG. 20, the recipient may read and review emails based upon the recipient action identifier 44 associated with the emails. In particular, and as discussed above, each email sent by a writer is labeled with a recipient action identifier 44 and is accordingly categorized as such, for example, by placement within predesignated folders as specified by instructions provided by the writer, when disclosed in the reading interface.

In accordance with a preferred embodiment, the reading interface 44, of the recipient, as shown in FIG. 1, is provided with an icon indicating emails requiring an answer 32, an icon indicating emails specifying an action to be undertaken 34 (i.e. ToDo), and an icon indicating emails that are solely intended for reading 36 (i.e. Read). As such, when a recipient wishes to read emails requiring an action, he or she simply clicks on the icon indicating emails requiring an answer 32 and a display is opened showing all of the emails requiring an answer. Such a procedure may similarly be used for emails simply requiring reading and emails requiring action on the part of the recipient.

In the alternative, the recipient may read emails based upon the read date 46, FIG. 5) indicated by the writer. In particular, and as discussed above, each email sent by a writer is labeled with a read date 46 identifying the date on which the writer wishes the recipient to read the email. With this in mind, the reading interface 44 includes a calendar icon 66 (FIG. 1) linking to a read calendar 68 (FIGS. 20 and 21) indicating dates on which received emails are intended to be read. Once the read calendar 68 is opened, the recipient is provided with colored numbers 70 in each of the days of the read calendar 68 indicating the number of emails necessary to be read on the specific date. The numbers are actually color coded to provide an indication as to the timeliness of the recipient's action in reading the emails. For example, emails that are to be read in the future are noted with, for example, the color green, emails that are to be read on or around the actual day are noted with, for example, the color yellow, and emails that were to be read in the past are noted, for example, with the color red. As such, and as with the emails requiring an action, the recipient clicks on the icon indicating emails requiring reading on a specific date, and a display is opened showing all of the emails requiring reading on the specified date.

Figure 20:
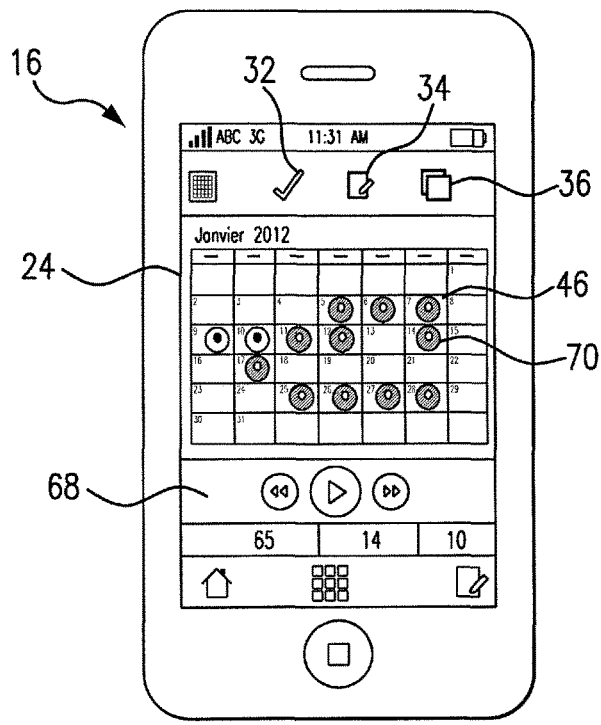
FIGS. 20-26 show various functionalities associated with the reading interface.
Figure 21:
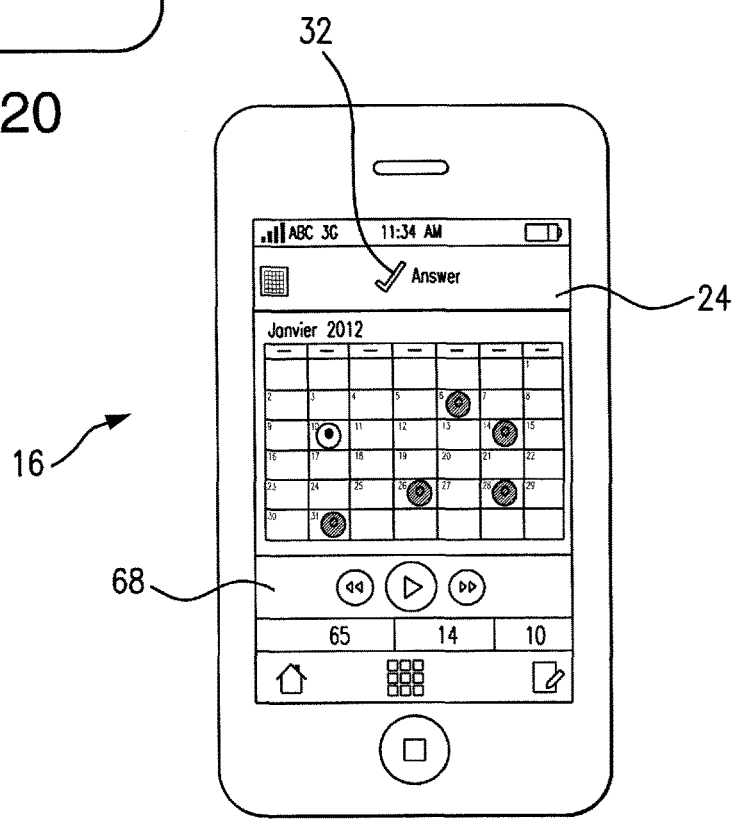

As shown with reference to FIG. 20, the reading interface 24 allows user to combine the filtering based upon reading dates 46 and the filtering based upon the recipient action identifiers 44. In particular, and once in the read calendar 68, the recipient may click on an action icon 32, 34, 36 to limit emails from a specific date to emails from that specific date as well as emails requiring the specific action identified.

Figure 22:
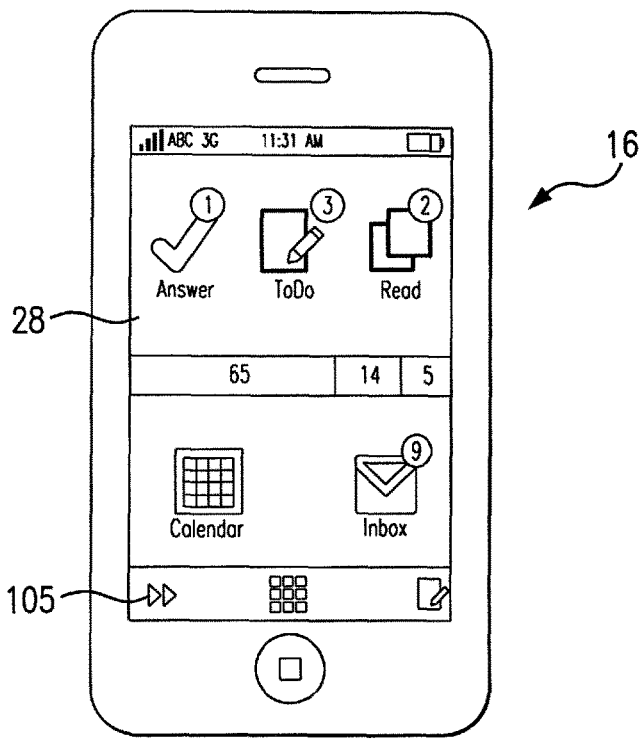
Figure 23:
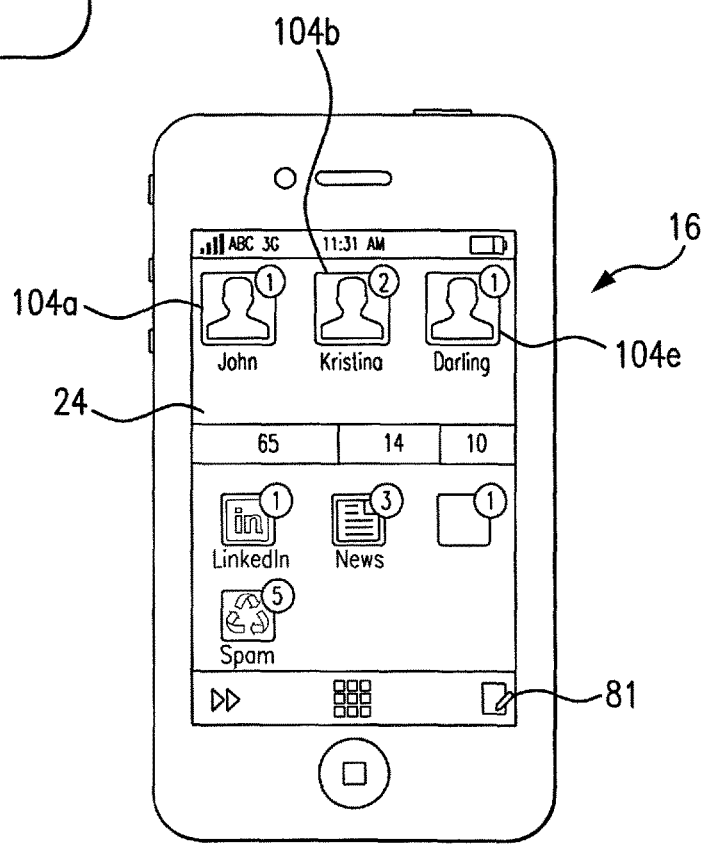

It is also appreciated a recipient can also specify some contacts as special VIP contacts. Any email sent by one of these VIP contacts will be accessible or copied in a predetermined folder 104a-c. Attention is directed to FIGS. 22 and 23, where the VIP contacts are exposed upon checking a VIP directional icon 105 on the home screen 28 and the reading interface 24 shows icons 104a-c that will immediately direct a reader to a graphical user interface showing specifically messages sent by such VIP contacts.

Figure 24:
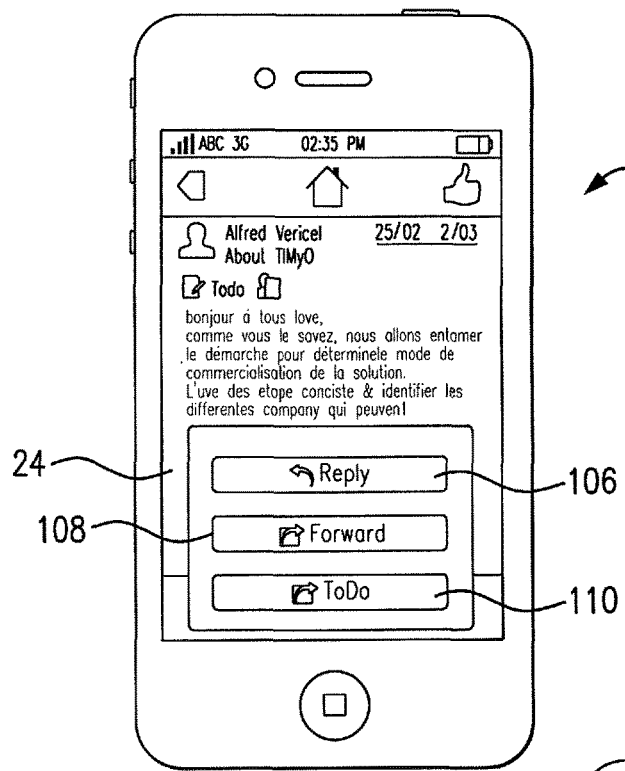
Figure 25:
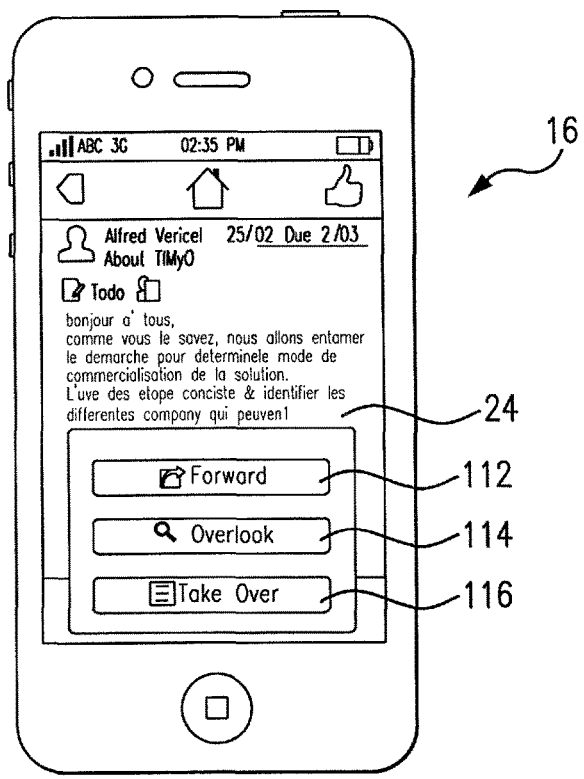
Figure 26:
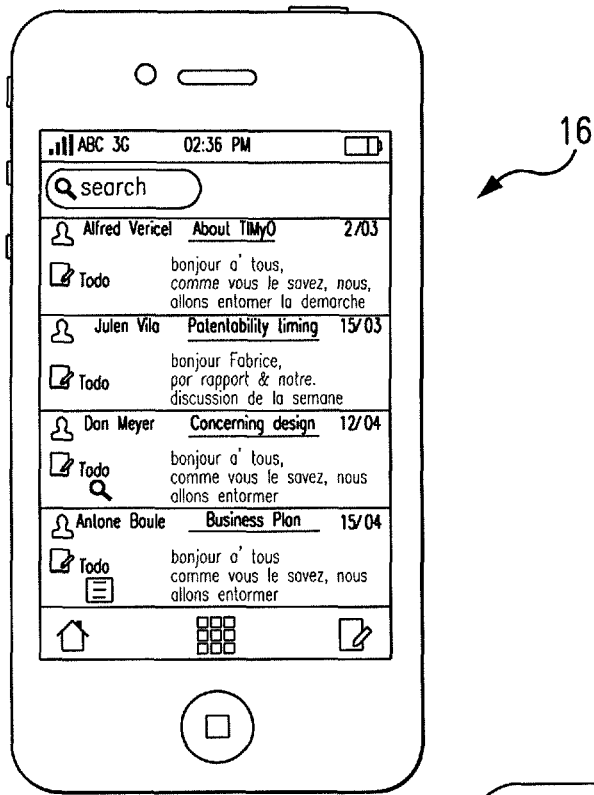
Figure 27:
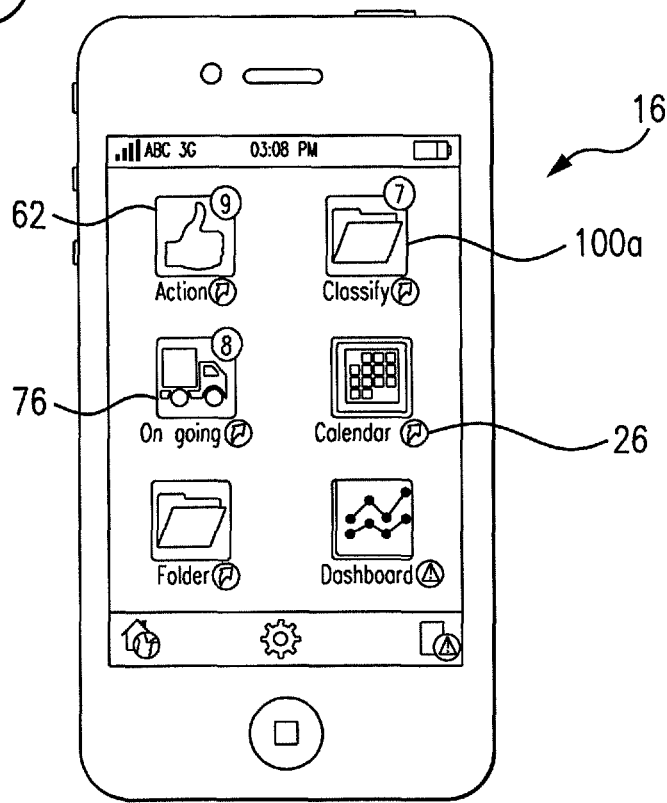
FIGS. 27-39 show various functionalities associated with the organizing interface.

Referring now to FIGS. 24, 25 and 26, the recipient may take various actions with received emails. In addition to replying to emails 106 and acting upon emails, the recipient is provided with the option to forward or otherwise deal with emails. For example, and upon receipt of an email, the recipient is provided with the option of forwarding the email 108 or employing the required action or ToDo function 110.

The required action or ToDo function 110 is employed in a manner allowing the recipient of an email to transform any email into a task that will be treated as any email that was sent using the present system. In particular, the writer clicks upon the required action or ToDo icon 110 of the reading interface 24 and the recipient is prompted to specify a due date 49 (in the same manner as discussed above with reference to FIG. 10). Such an email will go into the Todo folder 94 of the recipient providing him, or her, an indication that some action must be achieved by the noted due date 49.

As for forwarding an email, the recipient clicks upon the forward icon 108 which results in the recipient being prompted with the option to simply forward the email 112, overlook the email 114 or take over the email 116 (see FIG. 25).

The forward function 112 is similar to a traditional forward function and allows a recipient to simply forward an email to a selected individual.

In addition to simply forwarding emails, the recipient may select the takeover function 118 for use in conjunction with an email being forwarded. In accordance with this functionality, the email and the added data as sent by the original writer is sent to another individual for action. The forwarded email can also be stored in a required action or ToDo folder 94a (as shown in FIG. 18). This email inherits all the data that has been sent by the initial sender. Both the initial sender and the forwarding sender, or only one of them, can be notified when the end receiver has treated or read the email. Further, the recipient may forward the email with an overlook function 120. This function, when the forwarding individual activates the overlook function, informs the subsequent recipient that when he or she is forwarding an email in order to warn the recipient of the email that he only needs to have a quick look at this email. As shown with reference to FIG. 26, when the emails are reviewed in the reading interface 24 they are provided with various icons indicative of their status and designation.

Referring to FIGS. 27-39, in addition to the writing functions and the reading functions, a plurality of organizing functions is provided. The plurality, of organizing functions, is primarily addressed via the organizing interface 26. As explained below in greater detail, the functionalities include an acknowledgement icon 72; a status identifier 74 allowing a recipient to provide a writer with the status of a previously requested recipient action; and writer status storage icon 62 providing a writer with a list 78 of previously requested actions and the status thereof.

Figure 28:
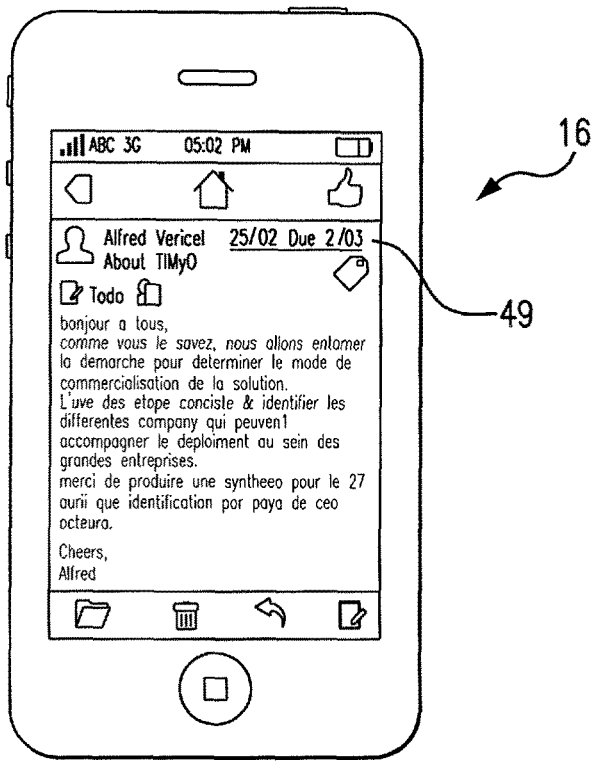

With reference to FIG. 28, as to the acknowledgement icon 72, and in accordance with a preferred embodiment, the organizing interface 26 provides a single icon allowing a user to indicate to someone else that the recipient agrees with the email or that the recipient likes the email, or that the recipient thanks the writer.

Figure 29:
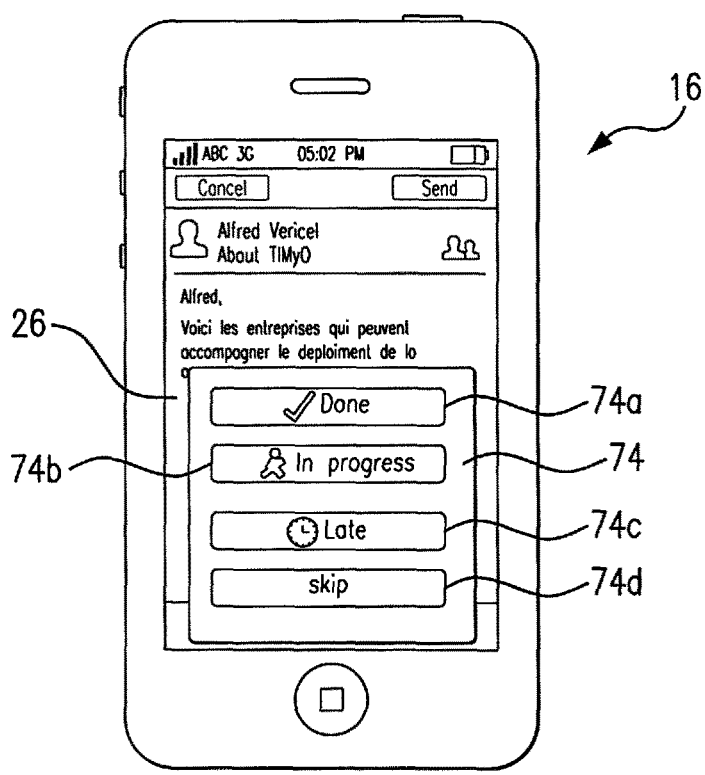

As mentioned above, the organizing interface 26 provides a mechanism for identifying the status of a requested action (see FIG. 29). This mechanism allows the user to select status identifiers 74 from such status identifiers such as done 74a, in progress 74b, late 74c and/or skip 74d, for example, and shown in FIG. 30 such indicators as shown in conjunction with emails.

Figure 30:
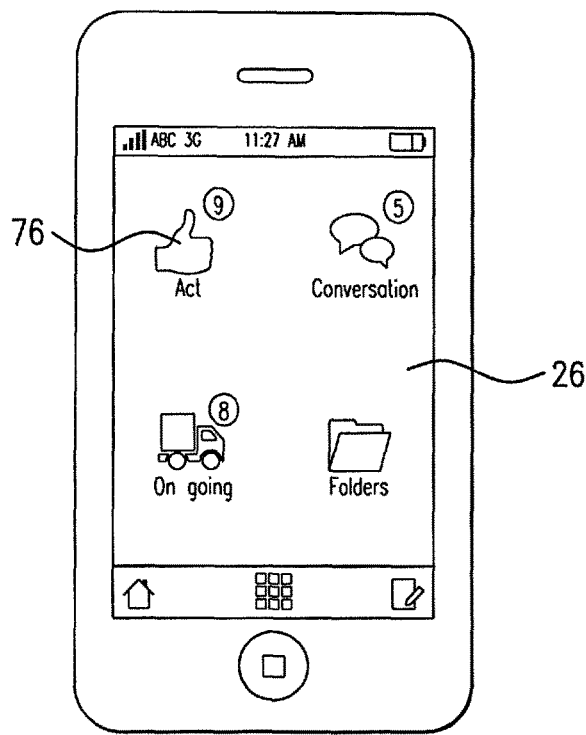
Figure 31:
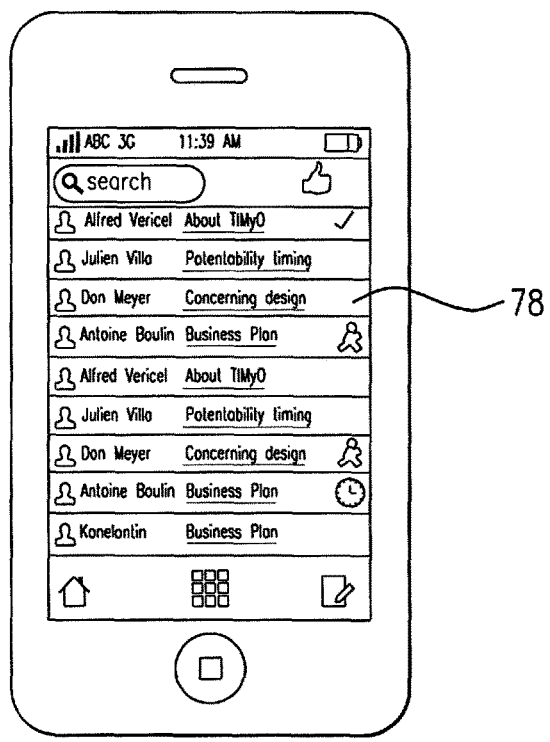
Figure 32:
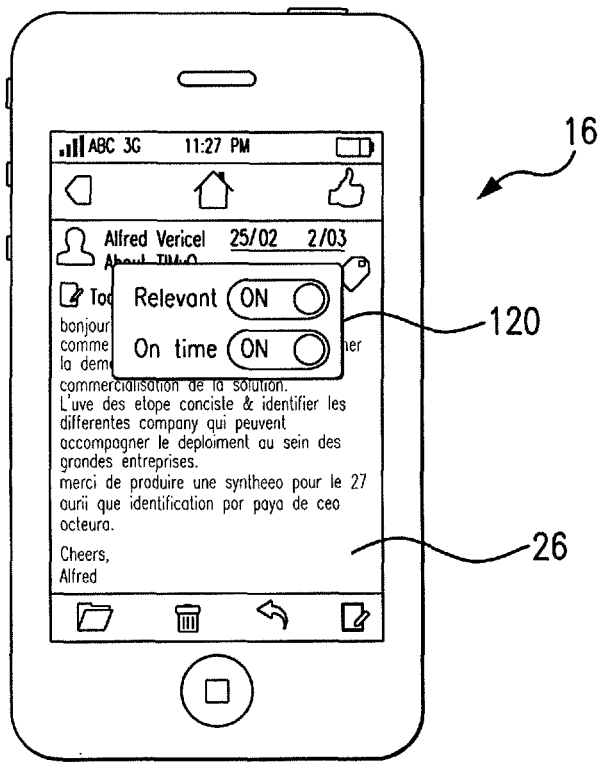

The status information provided by the recipient may be accessed by the writer using the writer status storage icon 62 which provides a writer with a list 78 of previously requested actions and the status thereof (see FIG. 30).

Figure 33:
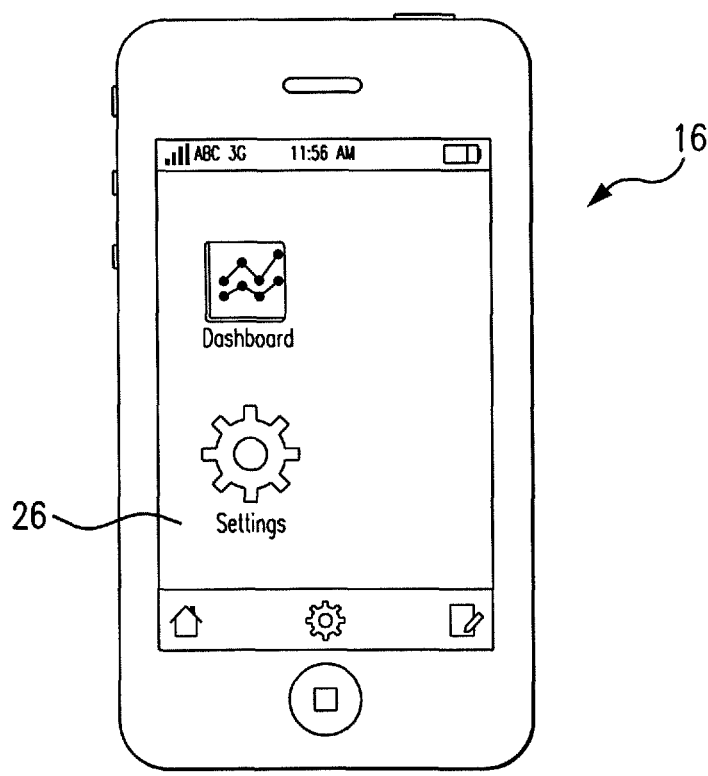
Figure 34:
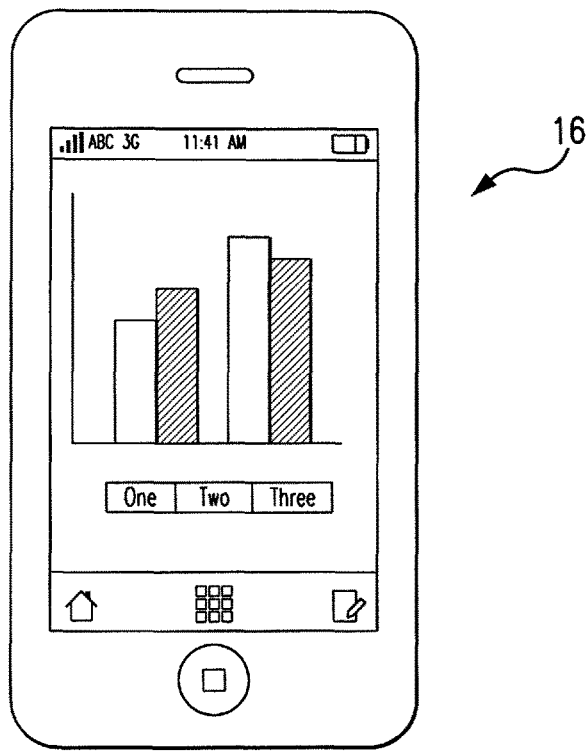
Figure 35:
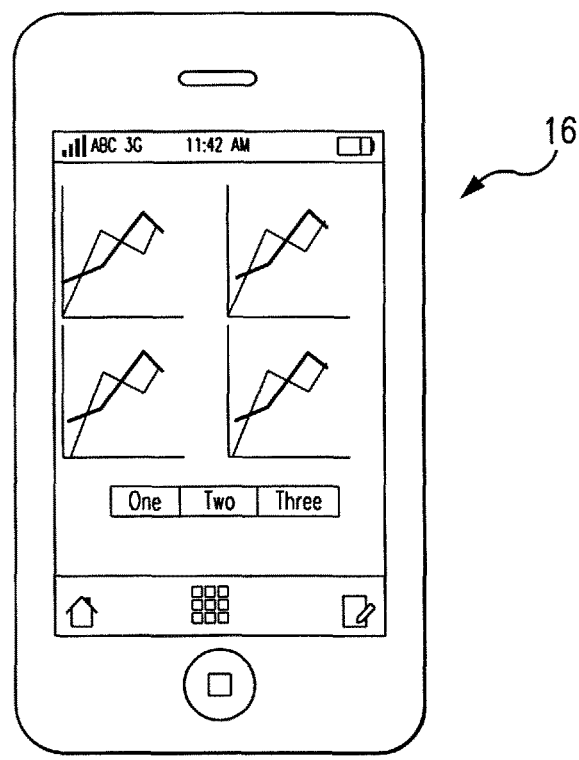

In addition to the functionalities discussed above, the organizing interface 26 can also provide an email rating 120 allowing a recipient to rate the received email (see FIG. 32), and tools for monitoring usage of the present communication method and system 10 by a user (see FIGS. 33, 34 and 35). With this in mind, the invention allows any user to score an email based on its pertinence, and a user or any person having access to the administration of the system can then analyze all the scores. Other statistics such as the number of received emails, the daily/weekly/monthly average number of sent/received emails, the most contacted people, the average response delay, the average difference between the response date and the read date, for each item or globally, can also be computed from the invention.

Figure 36:
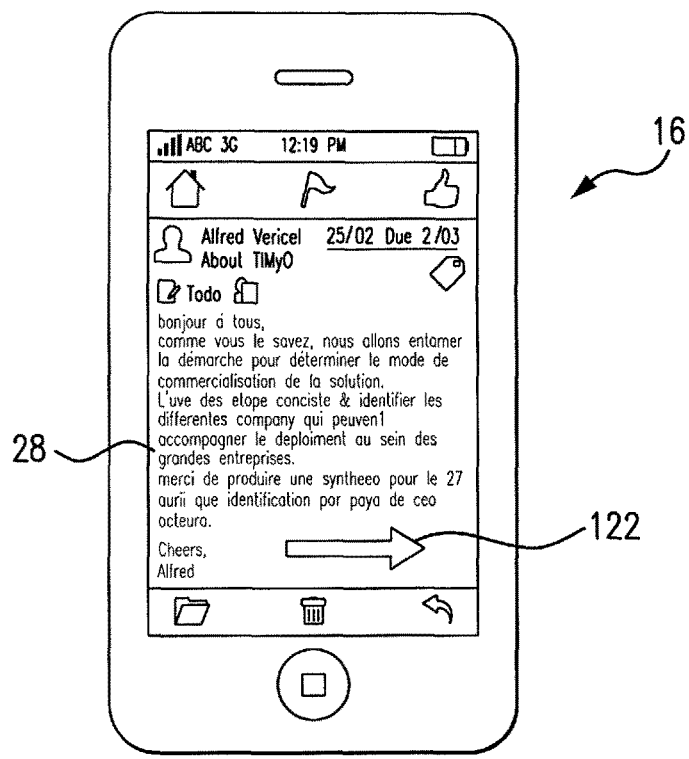
Figure 37:
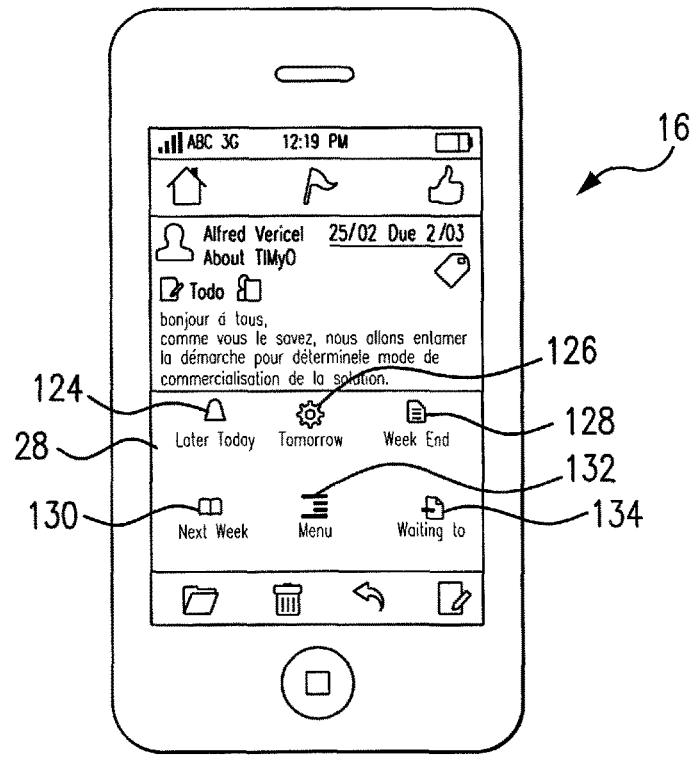
Figure 38:
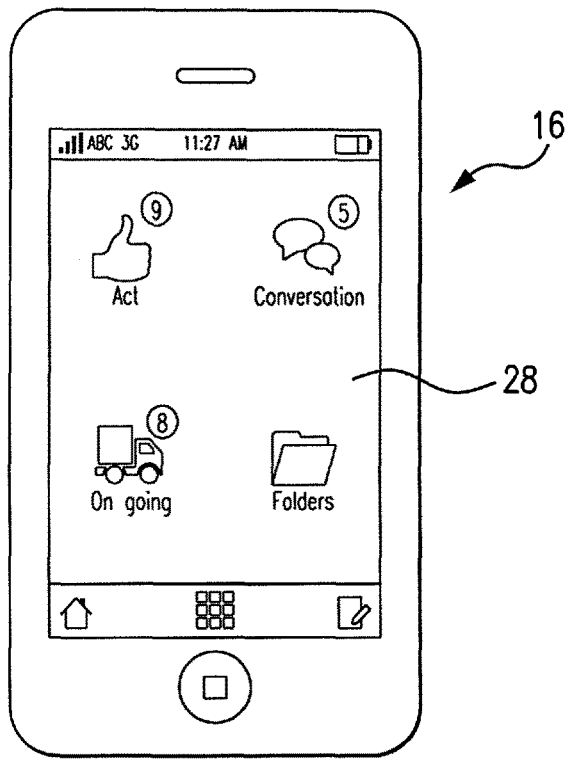
Figure 39:
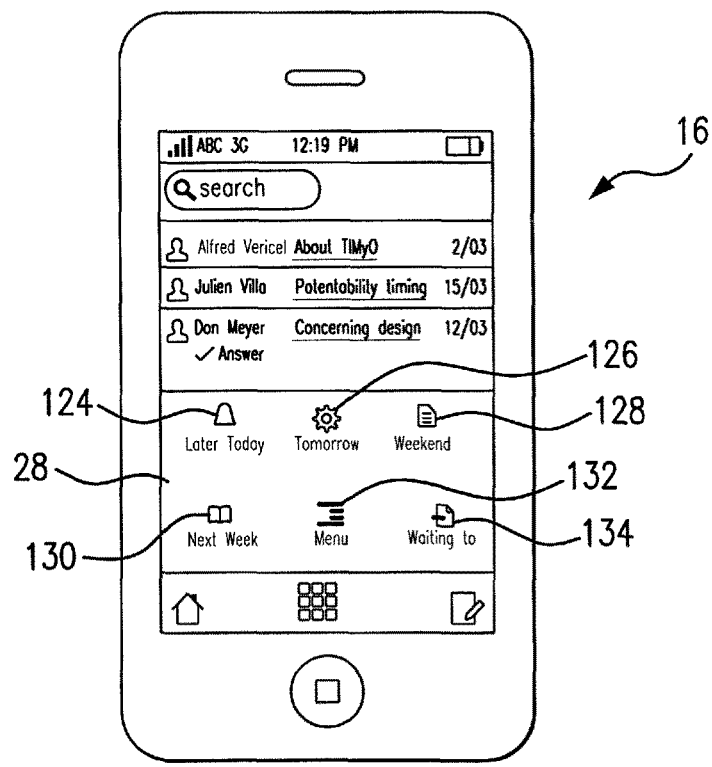

With reference to FIGS. 36, 37, 38 and 39 a response scheduling functionality for scheduling, preparation and delivery of responses to emails is provided. The delay between reception, the read date and/or the acknowledgement may be useful for a recipient and/or a manager. As shown in FIGS. 36 and 37, a swipe of an email 122 will bring up a display allowing the recipient to include an email for a reply later today 124, tomorrow 126, week's end 128, next week 130, a specific day of the month 132 or when other action is completed 134. Similarly, and with reference to FIGS. 38 and 39, the recipient may click upon the ongoing icon 136 for a list of emails which then may be scheduled by simply checking upon and using the same description discussed above with regard to FIG. 38.

The organizing interface also allows the recipient to check emails and archive the emails in the folders of choice. The recipient simply clicks upon the classify icon 100a (see FIG. 27) on the email and indicates the folder in which various emails should be stored.

In addition to the features discussed above, it is appreciated the present system may implement all the other common features already known to emails, such as file attachments, automatic address book update with new email addresses present in sent or received emails, orthographic and grammar correction, style, etc.

The functionalities and interfaces described herein may be implemented by typical computer systems. As such, embodiments of the present invention may be implemented as programmable code for execution by such a computer system. Such a computer system includes one or more processors. The processor(s) may be any type of processor, including but not limited to a special purpose or a general-purpose digital signal processor. The processor is connected to a communication infrastructure (for example, a bus or network). Various software implementations are described in terms of this exemplary computer system. After reading this description, it will become apparent to a person skilled in the art how to implement the invention using other computer systems and/or computer architectures.

The computer system also includes a main memory, preferably random access memory (RAM), and may also include a secondary memory. The secondary memory may include, for example, a hard disk drive and/or a removable storage drive, for example, a floppy disk drive, a magnetic tape drive, an optical disk drive, etc. The removable storage drive reads from and/or writes to a removable storage unit in a well-known manner, wherein the removable storage unit may be a floppy disk, magnetic tape, optical disk, etc., which is read by and written to by removable storage drive. As will be appreciated, removable storage unit includes a computer usable storage medium having stored therein computer software and/or data.

The computer may also include a removable storage unit and an interface. Examples of such means may include a program cartridge and cartridge interface (such as that previously found in video game devices), a removable memory chip (such as an EPROM, or PROM, or flash memory) and associated socket, and other removable storage units and interfaces which allow software and data to be transferred from removable storage unit to computer system. The program may also be executed and/or the data accessed from the removable storage unit, using the processor of the computer system. It is also appreciated the computer system may also include a communication interface allowing software and data to be transferred between computer system and external devices.

The terms "computer program medium" and "computer usable medium" are used generally to refer to media such as removable storage drive, a hard disk installed in hard disk drive, and signals. These computer program products are means for providing software to computer system. However, these terms may also include signals (such as electrical, optical or electromagnetic signals) that embody the computer program disclosed herein.

Computer programs (also called computer control logic) are stored in main memory and/or secondary memory. Computer programs may also be received via communication interface. Such computer programs, when executed, enable computer system to implement embodiments of the present invention as discussed herein. Accordingly, such computer programs represent controllers of computer system. Where the embodiment is implemented using software, the software may be stored in a computer program product and loaded into computer system using removable storage drive, hard disk drive, or communication interface, to provide some examples.

Alternative embodiments may be implemented as control logic in hardware, firmware, or software or any combination thereof.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A system including one or more processors for organization, preparation and viewing of emails, comprising:
    a graphical user interface operating on a display of a computing device, the graphical user interface including:
    a writing interface with a plurality of writing functions; a reading interface with a plurality of reading functions; and an organizing interface with a plurality of organizing functions: the plurality of writing functions including a recipient action identifier indicating what is expected of the recipient with regard to the sent email, what folder the writer has designated the email is to be stored in on the recipient computing device, a read date identifying a date on which the writer wishes the recipient to read the email, and a writing block for text associated with a message being sent in accordance with the email, wherein the recipient action identifier and the read date are appended to the email and used by a computer system of a recipient upon receipt of the email by the recipient, wherein the plurality of reading functions includes a takeover function and an overlook function for use in conjunction with a forward function.

2. A system including one or more processors for organization, preparation and viewing of emails, comprising:
    a graphical user interface operating on a display of a computing device, the graphical user interface including:
    a writing interface with a plurality of writing functions; a reading interface with a plurality of reading functions; and an organizing interface with a plurality of organizing functions: the plurality of writing functions including a recipient action identifier indicating what is expected of the recipient with regard to the sent email, what folder the writer has designated the email is to be stored in on the recipient computing device, a read date identifying a date on which the writer wishes the recipient to read the email, and a writing block for text associated with a message being sent in accordance with the email, wherein the recipient action identifier and the read date are appended to the email and used by a computer system of a recipient upon receipt of the email by the recipient, wherein the plurality of reading functions includes a takeover function for use in conjunction with a forward function wherein the takeover function transforms the email into a task to do.

* * * * *